United States Patent [19]

Tobin

[11] 4,141,581

[45] Feb. 27, 1979

[54] TRUCK BOX LINER

[76] Inventor: Harvey A. Tobin, Langford, S. Dak. 57454

[21] Appl. No.: 848,607

[22] Filed: Nov. 4, 1977

[51] Int. Cl.² ............... B60P 1/00; B62D 33/08
[52] U.S. Cl. ............... 296/39 R; 105/261 R; 214/501; 296/10; 296/26; 298/23 F
[58] Field of Search ............... 296/39 R, 26, 10, 27, 296/28 K, 50, 56; 298/1 R, 23 F, 23 D, 23 DF; 214/501, 502, 370; 105/261 R, 261 A, 270

[56] References Cited

U.S. PATENT DOCUMENTS

| 3,442,550 | 5/1969 | Esbeck | 296/50 |
| 3,895,842 | 7/1975 | Fair | 298/1 R |

Primary Examiner—Richard A. Bertsch
Attorney, Agent, or Firm—Jacox & Meckstroth

[57] ABSTRACT

A liner for a truck box for increasing the volumetric load carrying capacity thereof. The liner is provided with wall portions extending higher than the walls which form the truck box. The liner has a tail gate which opens automatically as the truck box is pivotally moved for dumping thereof.

6 Claims, 8 Drawing Figures

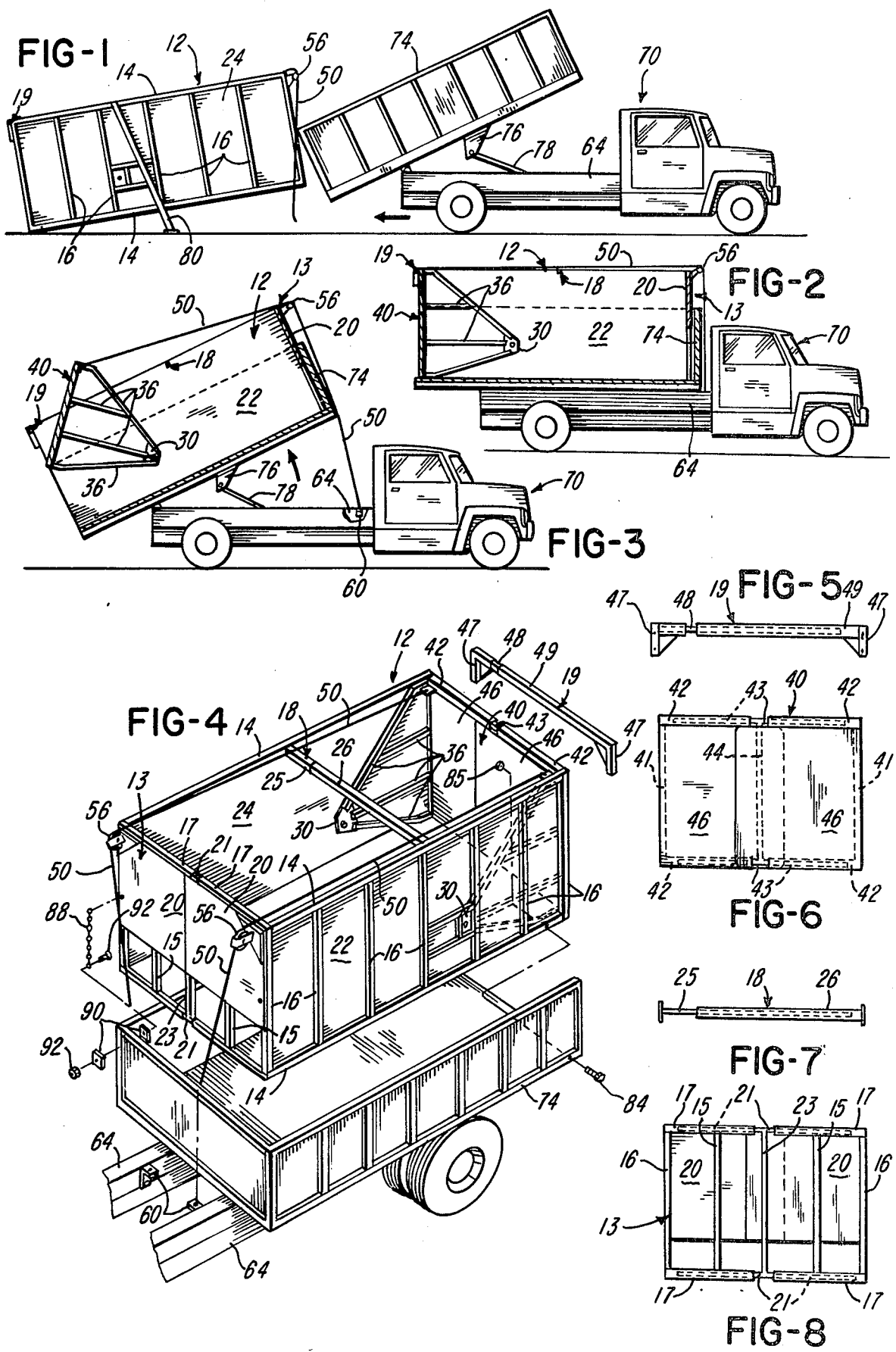

TRUCK BOX LINER

BACKGROUND OF THE INVENTION

A truck box is usually designed to carry a maximum load based upon an estimated maximum weight per unit of volume. Thus, when it is desired to carry a load in the truck box which has relatively light weight per unit volume, the volumetric capacity of the truck box limits the volume of the load to a magnitude less than the weight carrying capacity of the truck box.

Known means for increasing volumetric capacity of a truck box have been cumbersome to install and to use. Also, known means to increase the volumetric capacity of a truck box have not been provided with means for readily dumping a load therefrom.

It is an object of this invention to provide means by which the volumetric capacity of a truck box can be easily and readily increased.

Another object of this invention is to provide such additional capacity means which includes an automatically operable tail gate.

Another object of this invention is to provide a liner which is adjustable in dimensions and which liner can be easily and readily installed in any conventional truck box.

Another object of this invention is to provide such a liner which can be constructed to be relatively light in weight.

Other objects and advantages of this invention reside in the construction of parts, the combination thereof, the method of construction, and the mode of operation, as will become more apparent from the following description.

SUMMARY OF THE INVENTION

A truck box liner of this invention comprises a plurality of enclosure wall members. A tail gate is pivotally supported by two of the enclosure wall members and is adapted to open automatically with dumping operation of the truck box. The liner, if desired, may be adjustable in dimensions.

BRIEF DESCRIPTION OF THE VIEWS OF THE DRAWING

FIG. 1 is a side elevational view of a truck box liner of this invention with a truck having a truck box and illustrating a procedure for placing the liner into the truck box.

FIG. 2 is a side elevational view, with parts shown in section, showing the liner within the truck box.

FIG. 3 is a side elevational view, with parts broken away and shown in section, showing a dumping operation of the truck box and liner and illustrating opening operation of the tail gate of the liner.

FIG. 4 is a fragmentary exploded perspective view, drawn on a larger scale than the other figures, showing the truck box supported by the truck frame, the liner within the truck box, and means attached to the truck frame for automatic opening of the tail gate of the liner with dumping operation of the truck box.

FIG. 5 is an elevational view illustrating the adjustment features of the end frame member of a liner of this invention.

FIG. 6 is an elevational view illustrating the adjustment features of an end gate of a liner of this invention.

FIG. 7 is an elevational view illustrating the adjustment features of a cross frame member of a liner of this invention.

FIG. 8 is an elevational view illustrating the adjustment features of a front wall member of a liner of this invention.

DESCRIPTION OF THE PREFERRED EMBODIMENT

A truck box liner 12 of this invention, as best shown in FIG. 4, comprises a plurality of longitudinally extending upper and lower horizontal frame members 14 and a plurality of vertically extending side frame members 16, which are between the upper and lower longitudinally extending horizontal frame members 14. A front section or front part 13 of the liner is attached to the forward vertically extending side frame members 16 and to the forward end of the horizontal frame members 14. The front part 13 of the liner comprises pairs of upper and lower horizontal tubular frame members 17 which are joined to the forward ends of the longitudinally extending upper and lower horizontal frame members 14 and to the vertically extending side frame members 16 at the forward ends of the frame members 14. Vertically extending frame members 15 are attached to the upper and lower horizontal tubular frame members 17 and extend therebetween.

Pairs of lower and upper horizontal bar members 21 slidably extend into the upper and lower pairs of horizontal tubular frame members 17 and are attached to a vertical bar member 23.

A pair of overlapping panel members 20 are attached to the horizontal tubular frame members 17 and to the vertical frame members 15 to form a front wall of the liner 12. As shown, the front wall does not necessarily need to extend to the lower ends of the vertical frame members 15.

Between the upper longitudinally extending horizontal frame members 14, intermediate the ends thereof, is a cross frame member 18 which comprises a tubular member 26 which is attached to one of the upper longitudinally extending horizontal frame members 14 and extends laterally therefrom. A bar member 25 is attached to the other upper longitudinally extending horizontal frame member 14 and extends laterally therefrom and has a portion slidably positioned within the tubular member 26.

The horizontal longitudinally extending frame members 14 and the vertically extending side frame members 16 support a side wall member 22 at one side of the liner 12 and a side wall member 24 at the other side of the liner 12.

Plates 30 are pivotally attached to the side wall members 22 and 24 and have connector members 36 attached thereto. The connector members 36 are also attached to a tail gate 40. The tail gate 40, as best illustrated in FIG. 6, comprises a pair of side frame members 41. Each of the side frame members 41 has a pair of laterally extending tubular frame members 42 attached thereto at the ends thereof. Horizontal bars 43 slidably extend into the tubular frame members 42 and are attached to a vertical bar 44. Overlapping panels 46 are attached to the side frame members 41 and to the laterally extending tubular frame members 42.

The end frame member 19 is positioned above the tail gate 40 when the tail gate 40 is in a closed position. The end frame member 19 comprises a pair of brackets 47 which are attached to the rear end of the upper horizontal frame members 14. To one bracket 47 a bar 48 is attached, and to the other bracket 47 a tubular frame member 49 is attached. The tubular frame member 49 slidably encompasses the bar 48.

Cable members 50 are attached to the tail gate 40 and extend forwardly at the upper portion of the liner 12 and engage pulley members 56 which are mounted upon the front section 13 at the upper portion thereof. The cable members 50 extend downwardly from the pulley members 56 and are attached to brackets 60 which are attached to truck frame members 64 of a truck 70. The truck 70 has a truck box 74 which is pivotally attached to the truck frame members 64. Hoist members 76 and 78, between the truck frame members 64 and the truck box 74, are employed to pivotally raise the truck box 74.

As shown and as described above, the front section or front part 13, the cross frame member 18, the tail gate 40 and the end frame member 19 are adjustable in dimension. Thus, the liner 12 is adapted to fit into any conventional truck box 74. If desired, the side portions of the liner 12 may also be adjustable in dimension by structure similar to that illustrated and discussed regarding other parts of the liner 12.

As illustrated in FIG. 1, in positioning the liner 12 into the truck box 74, the liner 12 is temporarily angularly supported by leg members 80. The truck 70, with the truck box 74 inclined, is reversed to receive the liner 12, and when the liner 12 is partially supported by the truck box 74, the leg members 80 are removed from the liner 12. Then the liner 12 is moved completely into the truck box 74. Bolt members 84 extend through the truck box 74 at the rear portion thereof and through the liner 12, and with nuts 85 attached to the bolt members 84, the liner 12 is joined to the truck box 74. Chain members 88 are attached to the front section 13 and to brackets 90 which are attached by bolt and nut assemblies 92 to the front portion of the truck box 74. Thus, the liner 12 is retained within the truck box 74. The portion of the liner 12 immediately below the panel members 20 is shown as being open. This opening permits the weight of the liner 12 to be minimized, as the front wall of the truck box 74 serves as a closure at the lower front part of the liner 12. However, this portion of the liner 12 may be closed if desired. If desired, the side wall members 22 and 24 may have a vertical dimension equal to that of the panel members 20. In this construction, the liner 12 has wall members only above the walls of the truck box 74, to minimize the weight of the liner 12. It is to be noted that the liner 12 is shown without a bottom. This construction further permits minimum weight and ease of assembly.

Thus, the truck box 74 with the liner 12 is capable of transporting a load which is considerably greater in volume than the the volume of a load which can be transported in the truck box 74. For this reason the liner 12 is particularly adapted for use in transporting loads which are relatively light in weight in consideration of the volume thereof.

When it is desired to dump a load carried by the truck box 74 and liner 12, the truck box 74 is pivotally moved, as illustrated in FIG. 3. When this pivotal movement of the truck box 74 occurs, the rear portion of the truck box 74 and liner 12 move downwardly. However, the cable members 50 attached to the truck frame members 64, lift the tail gate 40 slightly and retain the tail gate 40 against downward movement with the rear portion of the truck box 74 and liner 12. During pivotal movement of the truck box 74 from the position thereof shown in FIG. 2 to the position thereof shown in FIG. 3, there is relative movement between the tail gate 40 and the rear portion of the liner 12. Thus, opening action of the tail gate 40 occurs, and the contents of the truck box 74 and the liner 12 are dumped. When the truck box 74 is again pivotally moved upwardly to the position thereof shown in FIG. 2, there is again relative movement between the rear end of the liner 12 and the tail gate 40 and closing action of the tail gate 40 occurs.

Although the preferred embodiment of the truck box liner of this invention has been described, it will be understood that within the purview of this invention various changes may be made in the form, details, proportion and arrangement of parts, the combination thereof, and the mode of operation, which generally stated consist in a truck box liner within the scope of the appended claims.

The invention having thus been described, the following is claimed:

1. For a truck having a truck frame and a truck box pivotally attached to the truck frame, a liner adapted to be positioned within the truck box including a front section and a pair of side walls, the front section comprising a pair of vertical side frame members, tubular members attached to the vertical side frame members, horizontal bar members slidably positioned within the tubular members, a vertical bar attached to the horizontal bar members, and overlapping panel members attached to the vertical side frame members and to the tubular members.

2. For a truck having a truck frame and a truck box pivotally attached to the truck frame, a liner adapted to be positioned within the truck box including a front section and a pair of side walls, a tail gate pivotally supported by the side walls, a cable member attached to the tail gate and extending over the front section and adapted to be attached to the truck frame for opening action of the tail gate with pivotal movement of the truck box, the tail gate comprising horizontal tubular members, a plurality of horizontal bar members slidable within the horizontal tubular members, a vertical bar member joined to the horizontal bar members, and a plurality of panel members joined to the horizontal tubular members.

3. For a truck having a truck frame and a truck box pivotally attached to the truck frame, a liner having a front portion and a rear portion and adapted to be positioned within the truck box, the liner comprising a pair of side wall members, telescopic connector members telescopically joined together and attached to the side wall members and positioned therebetween for attaching the side wall members together and for adjustment of the spacing between the side wall members, overlapping panel members attached to the telescopic connector members at the front portion of the liner so that the panel members form a front wall which is adjustable in width with adjustment of the spacing between the side wall members.

4. The liner of claim 3 which includes a tail gate at the rear portion thereof, the tail gate comprising a plurality of vertically extending frame members, means pivotally attaching an opposed pair of the vertically extending frame members to opposed side wall members, horizontally extending telescopic frame members attached to the vertically extending frame members and extending between the side wall members for adjustment of the width of the tail gate with adjustment of the spacing between the side wall members, and overlapping panel members attached to the telescopic members to form a closure which adjusts in dimension with adjustment of the width of the tail gate.

5. The liner of claim 3 which includes a plurality of horizontally extending tubular members attached to each of the side wall members, a plurality of bar members, there being a bar member slidably positioned within each of the tubular members, and a frame member attaching the bar members together.

6. The liner of claim 3 in which there is at least one telescopic member attached to each of the side wall members intermediate the front portion and rear portion of the liner, the telescopic members being telescopically joined together and relatively movable for changing the spacing between the side wall members.

* * * * *